July 13, 1948.  E. V. GOUINLOCK  2,445,111
MACHINE FOR STACKING HAY OR STRAW
Filed Nov. 23, 1945  2 Sheets-Sheet 1
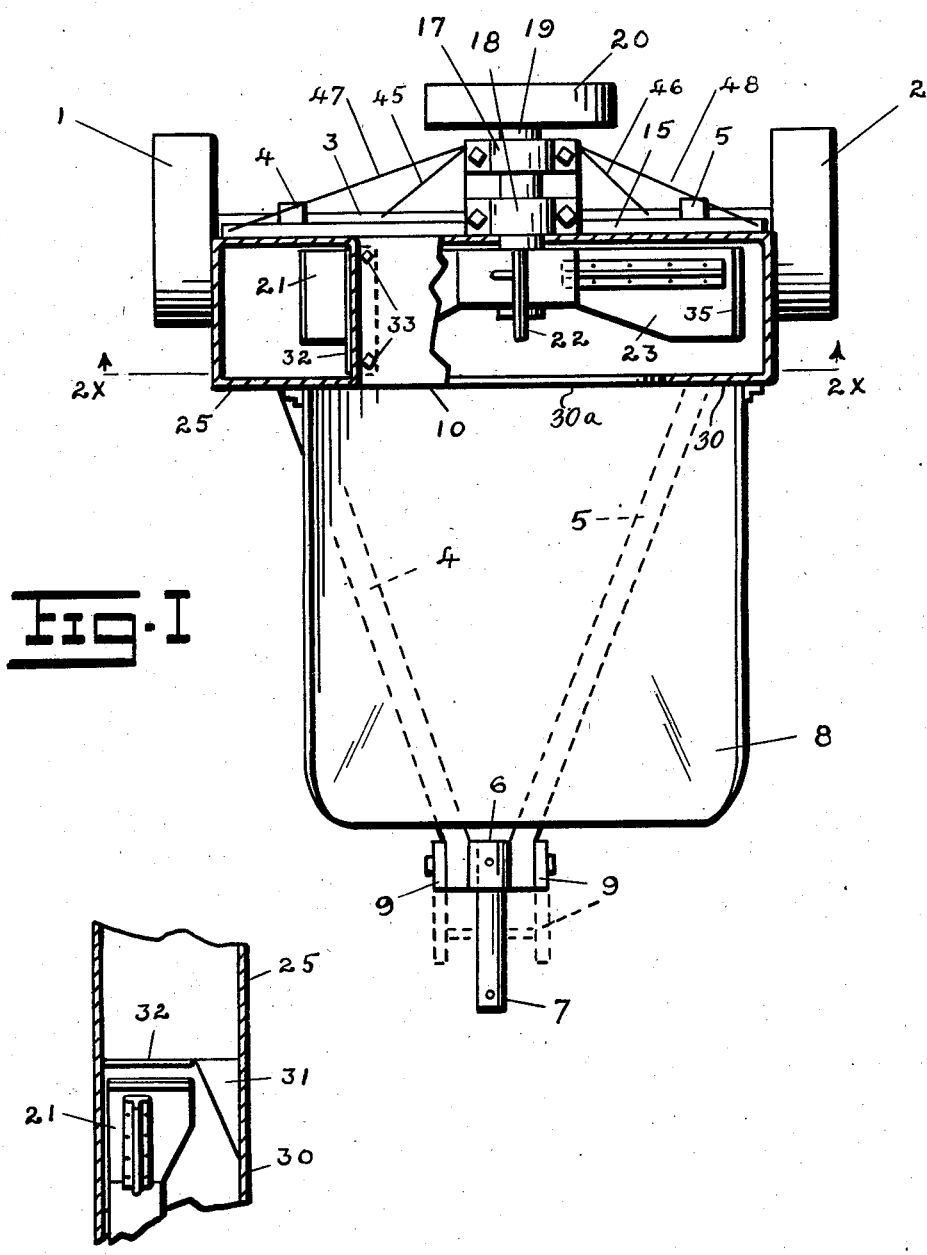
Inventor
Edward V. Gouinlock
By Frank Kuiper
Attorney July 13, 1948.  E. V. GOUINLOCK  2,445,111
MACHINE FOR STACKING HAY OR STRAW
Filed Nov. 23, 1945  2 Sheets-Sheet 2
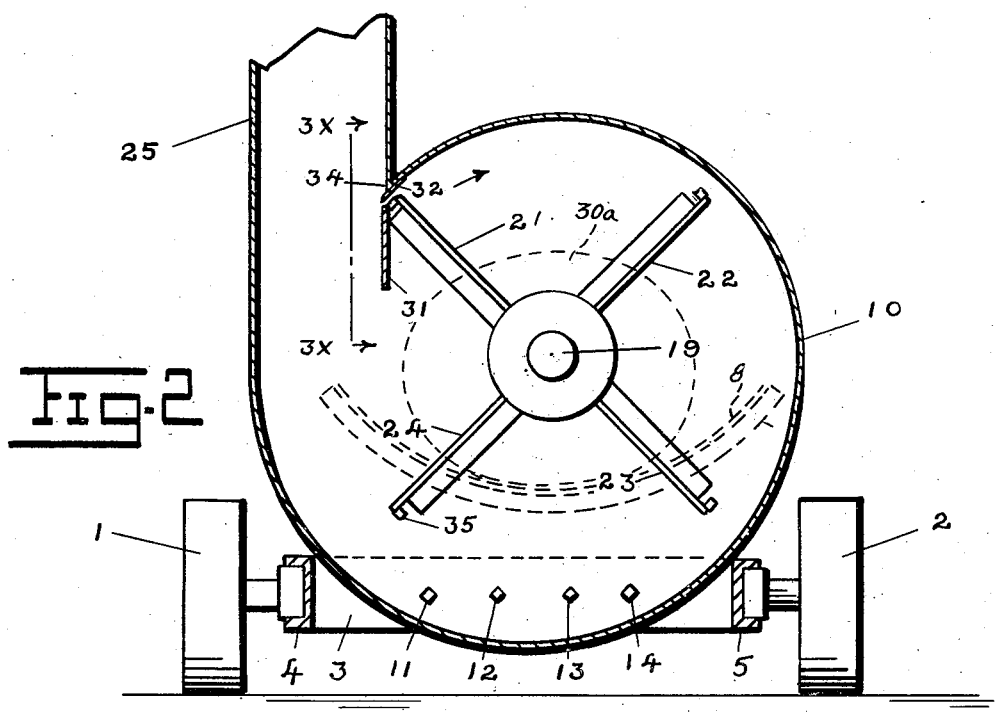
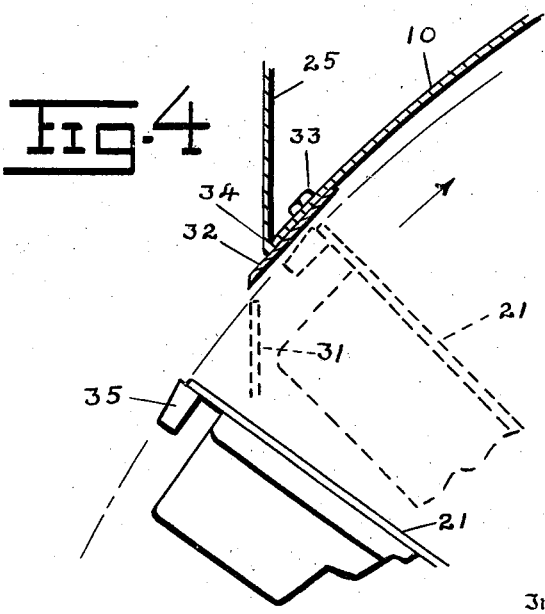
Inventor
Edward V. Gouinlock
By Frank Keiper
Attorney Patented July 13, 1948

2,445,111

UNITED STATES PATENT OFFICE 2,445,111

MACHINE FOR STACKING HAY OR STRAW

Edward V. Gouinlock, Warsaw, N. Y.

Application November 23, 1945, Serial No. 630,525

2 Claims. (Cl. 302—37)

The object of this invention is to provide a machine that can be used for stacking hay or straw or for placing hay or straw in the barn.

Another object of the invention is to build the machine so that it will not clog up, but will keep itself clean.

These and other objects of the invention will be illustrated in the drawings, described in the specification and pointed out in the claims at the end thereof.

In the drawings:

Figure 1 is a top plan view of the machine with the fan casing and the stack partly broken away.

Figure 2 is a vertical section on the line 2x, 2x of Figure 1, the position of the fan blade being shifted 45° from that shown in Figure 1.

Figure 3 is a vertical section on the line 3x, 3x of Figure 2.

Figure 4 is a vertical section on the line 4x, 4x of Figure 3, the figure showing the parts greatly enlarged over the corresponding part of Figure 3.

Figure 5 shows a modification of Figure 3 showing the knife blade 32 cut short and the triangular plate 31 extending up into contact with the wall of the spout 25.

In the drawings like reference numerals indicate like parts.

In the drawings:

Figure 1 is a top plan view of the apparatus which is shown mounted on two wheels 1 and 2, like a cart. 3 indicates a channel shaped axle which is supported by the wheels and on which the wheels rotate. This axle supports the channel shaped members 4 and 5 which extend forward and come together at the front and are welded to a sleeve 6. In this sleeve slides a draw bar 7, which is shown in the forward position in Figure 1 and can be pushed rearwardly under the feed pan 8. The assembly of the parts 4 and 5 and the sleeve 6 is supported by legs 9, 9 as shown in Figure 1. These legs can be swung up to the dotted line position or swung down so as to rest on the ground. The feed pan is about forty inches square and on this the hay or straw is thrown. It is inclined downwardly from the front to the rear. That is, it is inclined downwardly toward the fan casing 10 so that the hay or straw is easily moved into the fan by gravity and drawn into the fan by suction.

The opening in the side of the fan casing that receives the material from the pan 8 is indicated by the reference numeral 30a. This opening is in fact somewhat oval, being smaller in its vertical diameter than in its horizontal diameter, and the long axis of the oval is located somewhat below the center of the shaft 19 of the fan.

The feed pan 8 is made of sheet metal that is substantially square or it can be a little wider at the rear end where it joins the fan casing than at the front end. This would be necessary in order to give the parallel lines to the sides of the feed pan 8. The front end and the sides of the feed pan 8 are all on a level, but the rear end of the feed pan is curved with a longer radius than the radius of the fan casing. The oval opening 30a into the fan casing and the curved rear edge of the pan 8 are shown by dotted lines on Figure 2. The curving of the rear edge of the feed pan gives the slope to the feed pan from front to back.

The fan casing is bolted to the axle by bolts as indicated at 11, 12, 13 and 14. The front 30 of the fan casing has an opening 30a through which the hay or straw passes from the feed pan 8 into the fan casing. Across the back of the fan casing 10 is an angle iron 15 which is fastened thereto by welding or by bolts or in any other suitable manner. This angle supports the bearing block 16 which in turn supports the bearings 17 and 18. In these bearings rotates a shaft 19 which is driven by a pulley 20. On the forward end of this shaft is carried the four fan blades 21, 22, 23 and 24 which rotate in the fan casing 10.

Leading tangentially sideways and upward from the fan casing is the discharge spout 25.

The fan casing itself is made with a larger radius than the radius of the fan and fan blades. The upper part of the fan casing has one radius and the lower part of the fan casing has a longer radius and the center of the fan casing is offset with reference to the center of rotation of the fan blades so as to give a gradually increasing clearance between the ends of the fan blades and the casing more especially in the lower half of the fan casing.

The fan blades rotate clockwise as shown in Figure 2.

On the front 30 of the fan casing and projecting rearwardly is a triangular plate or block 31. This plate is placed so as to divert the hay or straw into the fan at that point and prevents it from clogging up in that corner of the fan casing. This plate 31 is shown in full lines in Figures 2 and 3 and its location is shown in dotted lines in Figure 4, it being understood that the section on which Figure 4 is taken is just back of this plate 31 as indicated by the section line on Figure 3.

For the purpose of also preventing the clogging of the hay and straw, I provide a knife blade 32 which is bolted to the fan casing as shown at 33 in Figures 1 and 4. As shown in Figure 4 the fan blades rotate clockwise and tend to carry some of the hay past the opening into the spout, and if this is continued the hay or straw will accumulate at the corner 34 where the discharge spout 25 joins the fan casing. That is, one end of each blade of hay will be in the spout and the other end will be in the fan casing. When sufficient hay or straw becomes lodged this way it interferes with the rotation of the fan. It is at this corner that the knife blade 32 is located.

On each of the fan blades 21, 22, 23 and 24 is fastened a metal block 35 which is intended to cooperate with the knife edge 32 for the purpose of shearing or cutting any of the stalks of hay or straw that are carried around by the ends of the fan blade.

It has been found by experience that the longer the stalks of hay or straw are when fed through the machine the more they are apt to accumulate or clog up at this corner 34, but by placing the knife blade 32 on this corner the stalks are carried against the knife edge and are cut into two pieces, the upper part of which is blown out through the spout 25 at once and the rest of it is carried around by the fan blades and blown out through the spout on the next revolution.

It will be understood that the blocks 35 do not actually touch the knife blade 32, but a small clearance between the blocks and the blade 32 is provided which however is small enough so as to insure the cutting of the stalks, and this prevents the accumulation of them at this place.

It is understood that the fan blades cannot be as broad as the width of the fan casing as shown in Figure 3 and therefore space must be allowed in the fan casing so that the hay or straw can be received therein while the fan is running. To insure the engagement between the stalks of hay or straw with the fan blades, the triangular plate 31 is located at the particular place indicated, as shown in Figure 2; namely, where the short side of the spout 25 joins the fan casing. This triangular plate deflects the blades of hay or straw from the open space in the front of the fan casing into the fan blades so that they are engaged by the fan blades and caught in the blast of air caused thereby, and all such stalks will be blown up the spout. Such stalks as are caught on the knife blade will be cut into two pieces and will be blown out so that they can not clog up at the corner indicated.

It will also be understood that the knife blade 32 preferably extends clear across the fan casing, and the upper edge of the triangular plate 31 stops slightly below the edge of the knife blade. But it will be also understood that the upper edge of the plate 31 as shown in Figure 5 can extend up into line with the knife blade and the knife blade can be cut away at that place to provide room therefor.

It will be understood also that the spout extends up indefinitely in height and can be bent over so that the hay or straw will be discharged either onto the hay stack or into any portion of a hay mow. Flexible stacks are provided for this purpose as a well-known article of manufacture.

It will also be understood that the outer end of the bearing block 16 is braced from the axle 3 by the braces 45 and 46 and is also braced from the angle 15 by the braces 47 and 48.

I claim:

1. In a machine for stacking hay or straw, the combination of a fan casing and a fan mounted to rotate therein, said fan having blades thereon, and the fan casing being deeper from front to back than the width of the blades, a spout having a long and a short side connected tangentially to the fan casing through which the fan can discharge hay or straw, a triangular shaped plate placed with its narrow base in the upper corner of the fan casing in front of the fan and just below where the short side of the spout and the fan casing come together, the tip of the plate being placed downwardly on the inside of the front of the casing, said plate tapering from its point upwardly and rearwardly toward the fan blades and causing the hay or straw to be deflected from the front of the fan casing toward the fan blades and into the spout.

2. In a machine for stacking hay or straw, the combination of a fan casing and a fan mounted to rotate therein, said fan having blades thereon, a spout connected tangentially to said fan casing through which the fan can discharge hay or straw, said spout having a long and a short side where it connects to the fan casing, a knife blade placed tangentially in the fan casing with the edge of the knife placed across the fan casing where the short side of the spout and the fan casing come together, a block placed on each of the fan blades and cooperating with said knife blade for the purpose of cutting the stalks of hay or straw that lodge in the spout and fan casing where they come together, a triangular shaped plate placed with its narrow base in the upper corner of the fan casing in front of the fan and just below where the short side of the spout and the fan casing come together, the tip of the plate being placed downwardly on the inside of the front of the casing, said plate tapering from its point upwardly and rearwardly toward the fan blades and causing the hay or straw to be deflected from the front of the fan casing toward the fan blades and into the spout.

EDWARD V. GOUINLOCK.

REFERENCES CITED

The following references are of record in the file of this patent:

UNITED STATES PATENTS

| Number | Name | Date |
|---|---|---|
| 559,452 | Huber et al. | May 5, 1896 |
| 857,742 | Lanquist | June 25, 1907 |
| 1,189,663 | Carson | July 4, 1916 |
| 2,026,732 | Farley | Jan. 7, 1936 |